US010106716B2

(12) United States Patent
Kusudo et al.

(10) Patent No.: US 10,106,716 B2
(45) Date of Patent: Oct. 23, 2018

(54) DUST SCATTER PREVENTING AGENT AND DUST SCATTER PREVENTING METHOD USING SAME

(71) Applicant: KURARAY CO., LTD., Kurashiki-shi (JP)

(72) Inventors: Kazumasa Kusudo, Okayama (JP); Hideo Hayashi, Okayama (JP); Yasuhiro Tsugita, Okayama (JP); Sigehiro Nieda, Kaga-gun (JP)

(73) Assignee: KURARAY CO., LTD., Kurashiki-shi (JP)

( * ) Notice: Subject to any disclaimer, the term of this patent is extended or adjusted under 35 U.S.C. 154(b) by 106 days.

(21) Appl. No.: 14/646,227

(22) PCT Filed: Nov. 20, 2013

(86) PCT No.: PCT/JP2013/081328
§ 371 (c)(1),
(2) Date: May 20, 2015

(87) PCT Pub. No.: WO2014/080960
PCT Pub. Date: May 30, 2014

(65) Prior Publication Data
US 2015/0299545 A1    Oct. 22, 2015

(30) Foreign Application Priority Data

Nov. 20, 2012  (JP) ................................. 2012-254723
Nov. 20, 2013  (JP) ................................. 2013-240477

(51) Int. Cl.
*C09K 3/22*    (2006.01)
*C09D 7/40*    (2018.01)
(Continued)

(52) U.S. Cl.
CPC .................. *C09K 3/22* (2013.01); *C09D 5/00* (2013.01); *C09D 7/12* (2013.01); *C09D 7/40* (2018.01);
(Continued)

(58) Field of Classification Search
CPC ........... B32B 43/00; B32B 9/00; B32B 17/06; C09K 3/22; C09D 7/40; C09D 5/00;
(Continued)

(56) References Cited

U.S. PATENT DOCUMENTS 5,455,114 A * 10/1995 Ohmory .................... D01F 6/14
                                                        428/364
5,976,433 A * 11/1999 Komatsu ................ B01D 69/08
                                                        210/500.23

(Continued)

FOREIGN PATENT DOCUMENTS

JP    58 117270    7/1983
JP    58 171470    10/1983
(Continued)

OTHER PUBLICATIONS

Vinylon definition from Wikipedia, 2015.*
(Continued)

*Primary Examiner* — Gregory R Delcotto
*Assistant Examiner* — Preeti Kumar
(74) *Attorney, Agent, or Firm* — Oblon, McClelland, Maier & Neustadt, L.L.P.

(57) ABSTRACT

Provided is a dust scatter preventing agent capable of preventing scattering of dust for a long period of time, by improving the strength of a coating layer formed on a surface of a tailing at a tailing accumulation site. A dust scatter preventing agent comprising an aqueous solution or aqueous dispersion that includes a hydrophilic polymer such as polyvinyl alcohol or a synthetic resin emulsion that has a (Continued)

property of being solidified and that has a contact angle with water of 45 degrees to 78 degrees, and an insoluble fiber material such as vinylon that has a cut length that is within a range of 0.5 mm to 30 mm, and a fineness that is within a range of 0.1 dtex to 20 dtex, with an amount of the insoluble fiber material with respect to the hydrophilic polymer being 0.1 to 1 by mass ratio, is spread over a surface of an object that includes fine particles having a particle size of 100 μm or less and hardened to form a coating layer on the surface of the object.

11 Claims, 3 Drawing Sheets

(51) Int. Cl.
     *C09D 5/00*      (2006.01)
     *C09D 7/12*      (2006.01)
     *C09D 129/04*      (2006.01)

(52) U.S. Cl.
     CPC ...... *C09D 129/04* (2013.01); *C08L 2205/025* (2013.01); *C08L 2205/16* (2013.01)

(58) Field of Classification Search
     CPC ... C09D 7/12; C09D 129/04; C08L 2205/025; C08L 2205/16
     USPC .......................... 156/704; 428/432, 698, 702
     See application file for complete search history.

(56) References Cited

U.S. PATENT DOCUMENTS

2006/0159934 A1* 7/2006 Reihs ...................... C03C 17/38
                                                                              428/432
2011/0259528 A1* 10/2011 Murase ................ C09D 7/1233
                                                                              156/704

FOREIGN PATENT DOCUMENTS

| JP | 60 093008 | 5/1985 |
| JP | 61 236867 | 10/1986 |
| JP | 62 039668 | 2/1987 |
| JP | 62 039669 | 2/1987 |
| JP | 63 112307 | 5/1988 |
| JP | 07 125817 | 5/1995 |
| JP | 07 206504 | 8/1995 |
| JP | 2000 096039 | 4/2000 |
| JP | 4436991 | 3/2010 |

OTHER PUBLICATIONS

JPLATPAT English translation of JP-07-206504.*
Indian Journal of Fibre & Textile Reasearch, vol. 37.Sep. 2012, pp. 287-291.*
International Search Report dated Feb. 10, 2014 in PCT/JP13/081328 filed Nov. 20, 2013.

* cited by examiner

DUST SCATTER PREVENTING AGENT AND DUST SCATTER PREVENTING METHOD USING SAME

TECHNICAL FIELD

The present invention relates to a dust scatter preventing agent for preventing the scattering of dust, and a dust scatter preventing method that uses that dust scatter preventing agent.

BACKGROUND ART

In a mine, ore that is mined is physically sorted, and is mainly sorted into useful ore and tailings, which is the remaining low-grade ore. Generally, the tailings are accumulated around the mine, and usually there is a very large amount of tailings. For example, when 100,000 t of ore is mined, the amount of copper that included in that ore is about 500 t, and the remaining 99,500 t is accumulated as tailings. On the other hand, there is a large amount of harmful materials such as heavy metals included in the tailings, and when such materials flow to the outside there is a possibility the materials could cause serious environmental problems. Therefore, in a mine a large area of land (hereafter, referred to as a "tailings accumulation ground") is prepared for processing and managing a large amount of tailings, and it is required that the tailings be properly processed according to a management plan that has been set beforehand.

At this tailings accumulation ground, various measures are taken so that the harmful materials that are included in the tailings do not flow to the outside. However, there is also material in the tailings that has been finely crushed into a powder state, and when that material is scattered by strong winds as dust, there is a possibility that the surrounding environment will be seriously damaged.

Typically, in order to prevent the scattering of dust, a method is used in which a coating agent that comprises resin and the like is spread over the surface of the tailings. However, conventional coating agents use aqueous emulsion, so after the coating agent has been spread, if it rains before the coating agent has hardened and a coating layer has been formed, the coating agent flows away, and there is a problem in that the coating agent might not be able to function properly.

In regard to this problem, JPS 61-236867 (A) discloses a coating agent that comprises a highly polymerized compound having imide bonding or a polyethyleneimine aqueous solution, and water-soluble dialdehyde, and that is able to form a gel soon after coating. With this kind of coating agent, it is possible to prevent the coating agent from flowing even when it rains after coating before the coating agent has hardened, so it definitely possible to form a coating layer. However, there is a problem in that the coating layer that is formed with this coating agent has low strength and does not have sufficient water resistance to rain water and the like.

JPS 62-39668 (A) discloses a coating agent that comprises an emulsion having an ionic structure, and resin emulsion that is emulsified by an emulsifier having ionic structure that is the opposite of that ionic structure. Moreover, JPS 62-39669 (A) discloses a coating agent that comprises a resin emulsion containing a cationic group, and a resin emulsion containing an anionic group. These coating agents are such that the coating layer that is formed after solidification is water insoluble, and has excellent strength and resistance to water. However, with these coating agents, it is difficult to maintain the coating layer over a long period of time. In addition, when several layers of objects such as tailings are accumulated to create a so-called "slag heap", the coating layer that is formed using this coating agent is not able to stabilize the objects that are accumulated on the coated surface. Therefore, when some kind of external force acts on the slag heap, there is a problem in that layer separation will occur starting at the boundary between the coating layer and the object accumulated on the coating layer, which causes the slag heap to give way and collapse.

In regard to this, JP 4,436,991 (B2) discloses technology of further including a fiber material such as cellulose fiber, natural fiber, inorganic fiber and the like in a coating agent that includes a specified synthetic resin adhesive type binder, plaster or clay, and water. A coating layer that is formed using this technology is not only insoluble to water and capable of maintaining an effect of preventing the scattering of dust and the like over a long period of time, but also, due to the effect of the fiber material, has excellent strength.

Moreover, JPH 07-125817 (A) discloses a coating agent in which polyvinyl alcohol (PVA) type fibers having a degree of swelling of 20% to 150%, a fineness of 0.5 denier to 5 deniers, and fiber length of 1 mm to 10 mm is dispersed into an aqueous solution or aqueous dispersion of organic polymers such as vinyl acetate type polymers, olefin type polymers, alkyd resin, epoxy resin and the like. The coating layer that is formed using this coating agent has high strength and excellent waterproofing and water-resistance characteristics.

However, the coating agents disclosed in JP 4,436,991 (B2) and JPH 07-125817 (A) are for the storage area of harmful materials such as final waste disposal sites, or piled debris, and are not intended for a case in which objects and coating layers are accumulated in an alternating manner in several layers such as in tailing accumulation sites. Therefore, with the coating agents disclosed in the literature above, even though it may be possible to for the coating layer itself to have excellent strength, it is not possible to solve the problem described above of the slag heaps giving way and collapsing.

RELATED LITERATURE

Patent Literature

[Patent Literature 1] JPS 61-236867 (A)
[Patent Literature 2] JPS 62-39668 (A)
[Patent Literature 3] JPS 62-39669 (A)
[Patent Literature 4] JP 4,436,991 (B2)

SUMMARY OF INVENTION

Problem to be Solved by Invention

The object of the present invention is to provide a dust scatter preventing agent that together with preventing dust from scattering over a long period of time by improving the strength of a coating layer that is formed on the surface of tailings at a tailing accumulation site, is also capable of preventing the separation of accumulated layers comprising tailings that are accumulated on the top of the coating layer.

Means for Solving Problems

The dust scatter preventing agent of the present invention comprises an aqueous solution or aqueous dispersion that includes a hydrophilic polymer that has a property of being solidified and has a contact angle with water of 45 degrees to 78 degrees after solidification, and an insoluble fiber material having a cut length within the range of 0.5 mm to 30 mm and a fineness within the range of 0.1 dtex to 20 dtex.

The insoluble fiber material preferably has a degree of swelling that is greater than 150% but no greater than 300%.

The contained amount of the insoluble fiber material that is included with respect to the hydrophilic polymer is preferably 0.1 to 1 by mass ratio.

The insoluble fiber material is preferably at least one kind selected from among vinylon, polyethylene-telephthalate (PET), and polyvinyl butyral (PVB).

On the other hand, it is also possible to use polyvinyl alcohol (PVA) or ethylene vinyl acetate emulsion as the hydrophilic polymer. Moreover, it is possible to use a fibrous polymer that is produced with the hydrophilic polymer as raw material, or in other words, a polymer having a polymer fiber form as the hydrophilic polymer. Particularly, it is preferable to use PVA having a degree of polymerization within the range of 1,000 to 5,000, and a degree of saponification of 95 mol % to 100 mol %.

Preferably, the dust scatter preventing agent is solidified to be in a form of a nonwoven fabric.

The dust scatter preventing method of the present invention comprises steps of preparing a dust scatter preventing agent of the present invention and forming a coating layer on the surface of an object that includes fine particles having a particles size of 100 μm or less by spreading and solidifying the dust scatter preventing agent on the surface of the object.

The dust scatter preventing agent of the present invention can be used in the case in which the object is dry as well as in the case in which the object has a gel-like structure containing moisture. Particularly, the present invention is applied to the case in which the object is tailings.

The dust scatter preventing agent is preferably spread at a ratio with respect to the surface area of the object of 0.5 $L/m^2$ to 8 $L/m^2$.

Effect of Invention

By using the dust scatter preventing agent of the present invention, it is particularly possible to improve the strength of a coating layer that is formed on the surface of tailings at a tailing accumulation site, and thus it is possible to prevent scattering of dust over a long period of time. Moreover, the coating layer that is formed on the surface of the tailings using the dust scatter preventing agent of the present invention is gradually dissolved by moisture that is included in tailings that are accumulated above the coating layer, and becomes integrated with the accumulated layer that is newly formed on the coating layer, so it is possible to prevent layer separation of the coating layer and the accumulated layer. In this way, with the dust scatter preventing agent and the dust scatter preventing method that uses this agent, it is possible to effectively prevent various environmental problems that occur due to the accumulation of tailings.

MODES FOR CARRYING OUT INVENTION

Figure 1:
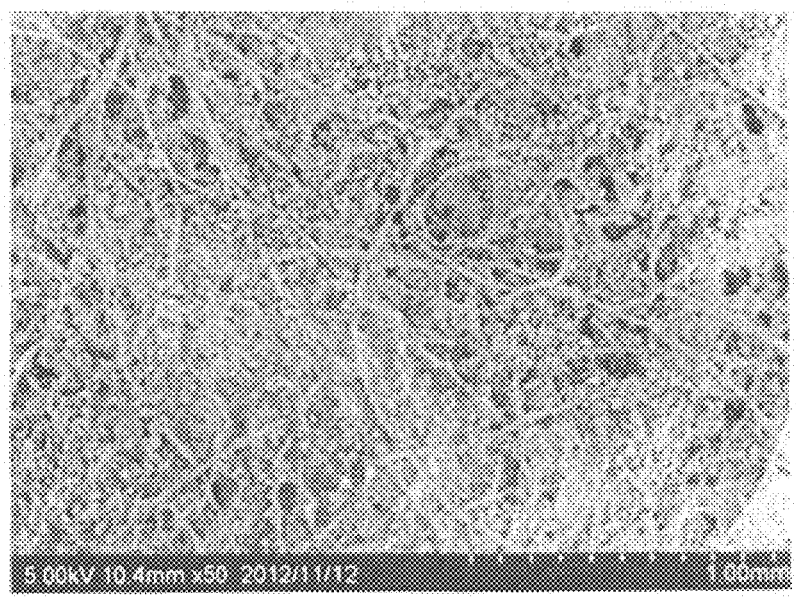
FIG. 1 is an SEM image (50×) illustrating a state in which a coating layer that was formed by the dust scatter preventing agent of the present invention catches fine particles such as dust.

In consideration of the problems described above, and as a result of diligent research of dust scatter preventing agents, the inventors were able to obtain knowledge of how to form a strong coating layer on the surface of tailings that were accumulated at a tailing accumulation site by using a dust scatter preventing agent that included a specified insoluble fiber material in an aqueous solution or an aqueous dispersion that includes a hydrophilic polymer having a property of being solidified. Moreover, the inventors obtained knowledge that a coating layer that was formed by using this dust scatter preventing agent showed suitable re-dissolution to moisture, so a newly accumulated layer and an accumulated later directly below that new layer are formed into an integrated accumulated layer by way of the coating layer, and thus it is possible to effectively prevent separation of these layers. The present invention was obtained based on this knowledge.

In the following, the present invention will be explained in detail. It is presumed that the present invention will be used at a tailing accumulation site such as in a mine, however the present invention may also be applied to the case in which the scattering of fine particles such as piled debris at a factory, or at a final waste disposal site becomes a problem.

1. Dust Scatter Preventing Agent

The dust scatter preventing agent of the present invention has a property of being solidified, and includes a hydrophilic polymer with a contact angle of 45 degrees to 78 degrees, and an aqueous solution or aqueous dispersion that includes an insoluble fiber material having a cut length within the range of 0.5 mm to 30 mm, and a fineness within the range of 0.1 dtex to 20 dtex.

(1) Composition of Dust Scatter Preventing Agent (Hydrophilic Polymer)

The hydrophilic polymer that can be used in the dust scatter preventing agent of the present invention is a polymer that has a property of being solidified when dried after being dissolved in an aqueous medium such as water, and also shows a hydrophilic characteristic after solidification; more specifically, it is necessary to use a hydrophilic polymer that has a contact angle with water within the range of 45 degrees to 78 degrees after solidification. By using this kind of hydrophilic polymer, at least a part of the surface of the hydrophilic polymer is dissolved by the moisture that is included in an object when an object is newly accumulated on top of a coating layer that is formed with the polymer being solidified, and as a result, an accumulated layer is formed by the newly accumulated layer becoming integrated with the accumulated layer directly below by way of the coating layer. Therefore, layer separation of the newly accumulated layer and the accumulated layer directly below that starts at the coating layer is prevented, and thus it is possible to prevent the outflow of accumulated tailings.

The contact angle with water after the hydrophilic polymer has hardened must be 45 degrees to 78 degrees, and preferably 57 degrees to 78 degrees, and even more preferably 60 degrees to 67 degrees. When the contact angle is less than 45 degrees, the durability of the coating layer that is obtained decreases and it is not possible to maintain the dust scatter prevention effect over a long period of time. On the other hand, when the contact angle is greater than 78 degrees, the adhesion with the insoluble fiber material decreases much and it is not possible to obtain a sufficient effect of preventing dust scatter. The contact angle in the present invention means the wettability of the surface of the coating layer after solidification, and can be measured using a contact angle meter.

It is possible to use an emulsion of a polyvinyl alcohol (PVA) or a synthetic resin as this kind of hydrophilic polymer.

When using PVA as a hydrophilic polymer, the polymer is not particularly limited as long as the contact angle is within the range described above. For example, it is possible to use PVA that is obtained by saponification of a homopolymer or copolymer that is obtained by combining one kind or two or more kinds of fatty acid vinylester, or a copolymer with another monomer that is capable of being copolymerized, or a denatured PVA that is obtained by denaturing these PVA. In the PVA above, the other monomer that is capable of copolymerization can be: an olefin such as ethylene, propylene and the like; a polymeric monocarboxylic acid such as acrylic acid, methacrylic acid, and the like; a polymeric dicarbon acid such as maleic acid, itaconic acid and the like; polymeric dicarbon acid anhydride such as maleic anhydride and the like; a salt or an ester of a polymeric monocarboxylic acid or polymeric dicarbon acid; a polymeric acid amide such as acrylamide, methacrylamide and the like; an acrylic acid ester such as methyl acrylate, ethyl acrylate and the like; a methacrylate ester such as methyl methacrylate, ethyl methacrylate and the like; a monomer having a glycidyl group such as allyl glycidyl ether, glycidyl methacrylate and the like; or an alkyls vinyl ether and the like.

However, the degree of saponification of PVA is preferably within the range of 95 mol % to 100 mol %, and more preferable within the range of 97 mol % to 100 mol %. When the degree of saponification is less than 95 mol %, the hydrophylic characteristic of the PVA becomes low, so the solubility for having a liquid composition decreases, and it may not be possible to obtain a good coating effect.

Moreover, the degree of polymerization of the PVA (number average molecular weight according to the GPC method) is preferably within the range of 1,000 to 5,000, and more preferably within the range of 1,000 to 3,000. When the degree of polymerization is less than 1,000, the strength of the obtained coating layer becomes low, and the water resistance of the coating layer also is inferior. On the other hand, when the degree of polymerization is greater than 5,000, the dust scatter preventing agent becomes a highly viscous liquid, so may hinder the workability when spreading the agent over the powdery or granular accumulated material.

When an emulsion of a synthetic resin is used as the hydrophilic polymer, similarly, the polymer is not particularly limited as long as the contact angle is within the range described above; however, from the aspect of adhesion with insoluble fiber material, using an ethylene vinyl acetate emulsion is preferred.

Furthermore, it is also possible to use a fibrous polymer (hereafter, referred to as a "polymer fiber") that is produced with the hydrophilic polymer described above as raw material. Such a polymer fiber is easily soluble in water, so there is no need to use special dissolving equipment such as a dissolving tank, and thus it is possible to produce a uniform polymer aqueous solution.

When polymer fiber is produced with PVA as raw material, preferably the polymer fiber is formed by a spinning method (solvent wet cooling gel spinning) in which spinning dope in the solvent is caused to become a gel by quick cooling immediately after being pressed from a nozzle, and then by implementing a desolvation treatment after a stable structure has been formed. Polymer fiber that is produced using this kind of method differs from vinylon that is obtained by normal dry spinning or wet spinning in that this polymer fiber is soluble even in normal water.

The contained amount of hydrophilic polymer that is included in the dust scatter printing agent of the present invention should be the necessary amount for forming a coating layer on the surface of an accumulated layer, and preferably is within the range of 0.1% by mass to 10% by mass with respect to the aqueous solvent, and more preferably within the range of 0.5% by mass to 5% by mass. When the contained amount of hydrophilic polymer included is less than 0.1% by mass, it is not possible to form a coating layer having the desired characteristics. On the other hand, when the contained amount is greater than 10% by mass, the viscosity increases, and it becomes difficult to spread the obtained dust scatter preventing agent.

(Insoluble Fiber Material)

The insoluble fiber material must be such that the cut length is within the range of 0.5 mm to 30 mm, and the fineness is within the range of 0.1 dtex to 20 dtex. By uniformly dispersing this kind of insoluble fiber material, it is possible to greatly improve the strength of the coating layer that is formed by the solidification of the dust scatter preventing agent. Moreover, this insoluble fiber material and the hydrophilic polymer cover the object in the form of a nonwoven fabric, so it becomes possible to catch particles even in the case of fine particles such as dust. Particularly, by using insoluble fiber material having the cut length and fineness specified in the present invention, it is possible to catch fine particles that have a particle size of 100 μm or less, so it is possible to effectively prevent the scattering of dust. In the present invention, it is possible to use a high polymer fiber material having a degree of swelling of 300% or less as the insoluble fiber material. This is because when the degree of swelling of the high polymer fiber material is greater than 300%, the fiber strength decreases, and it becomes impossible to form a coating layer having the desired characteristics. Here, a sample of a specified amount of fiber material is taken, and that material is cut into fiber lengths of 3 mm and immersed in water at normal temperature (30° C.) for 30 minutes, then using a centrifuge, centrifugal dewatering is performed at 3000 rpm for 10 minutes and the mass ($W_1$) of the fiber material is measured, after which this fiber material is further dried at 105° C. for 4 hours using a hot air drier and the mass ($W_0$) of the obtained fiber material is measured, and the value of the degree of swelling ($\gamma$) is found from the equation: $\gamma\ (\%)=(W_1-W_0)/W_0\times100$.

The cut length of the insoluble fiber material must be within the range of 0.5 mm to 30 mm, and preferably within the range of 1 mm to 20 mm, and even more preferably within the range of 2 mm to 15 mm. When the cut length is less than 0.5 mm, the added fibers are too fine, so not only is it not possible to improve the strength of the coating layer, it is not possible to prevent the scattering of particles that are 100 μm or less. On the other hand, when the cut length is greater than 30 mm, it becomes difficult to uniformly disperse the insoluble fiber material.

The fineness of the insoluble fiber material (single filament fineness) must be within the range of 0.1 dtex to 20 dtex, and preferably within the range of 0.5 dtex to 5 dtex, and even more preferably within the range of 1 dtex to 5 dtex. When the fineness is less than 0.1 dtex, it becomes difficult to uniformly disperse the insoluble fiber material. On the other hand, when the fineness is greater than 20 dtex, the amount of fiber included per unit mass decreases, and not only is it not possible to improve the strength of the coating layer, it is not possible to prevent the scattering of particles that are 100 μm or less.

The degree of swelling of the insoluble fiber material must be 300% or less as described above, however, is preferably greater than 150% but no greater than 300%, and more preferably is greater than 150% but no greater than 250%, and even more preferably is no less than 160% and no greater than 200%. When the degree of swelling is within such a range, it is possible to uniformly disperse the insoluble fiber material, and to make the strength of adhesion to the hydrophilic polymer high. When the degree of swelling is 150% or less, it may not be possible to uniformly disperse the insoluble fiber material and to make the strength of adhesion to the hydrophilic polymer sufficiently strong.

As long as the conditions described above are satisfied, the insoluble fiber material used is not particularly limited, however, from the aspect of improving the strength of the coating layer, it is possible to use at least one kind selected from among vinylon, polyethylene-telephthalate (PET), polyvinyl butyral (PVB) and the like. However, when vinylon, which is a PVA fiber, is used, vinylon having a solubility temperature in water of preferably 50° C. or greater, and more preferably 55° C. or greater, and even more preferably 60° C. or greater should be used. When the solubility temperature in water is less than 50° C., the fiber is dissolved when mixing with the hydrophilic polymer and it becomes impossible to maintain the fibrous state, so the strength of the obtained coating layer may decrease. Moreover, the fiber material dissolves in rainwater or the like, so not only does it become difficult to maintain the strength of the coating layer over a long period of time, but the fiber simultaneously dissolves during re-dissolution of the hydrophilic polymer, so it may not be possible to obtain the effect of preventing separation of the coating layer and accumulated layer. On the other hand, the upper limit of the solubility temperature is not particularly limited, however, is preferably 75° C. or less, and more preferably 70° C. or less. This is because, insoluble fiber material that has a solubility temperature greater than 75° C. does not sufficiently adhere to the hydrophilic polymer, so the strength of the coating layer may decrease. In the present invention, the solubility temperature means the temperature at which the insoluble fiber material completely dissolves when a 2.6 g sample is placed in a mixing tank with 400 mL of water, and mixed at 280 rpm using a mixer (Tornado Standard SM-1-3, manufactured by As One Corporation).

The contained amount of insoluble fiber material with respect to the hydrophilic polymer, is preferably 0.1 to 1 by mass ratio, and more preferably 0.1 to 0.7, and even more preferably 0.1 to 0.5. When the mass ratio is less then 0.1, it is not possible to sufficiently improve the strength of the coating layer. On the other hand, when the mass ratio is greater than 1, the amount of mesh that is formed by the insoluble fiber material becomes excessive, so the amount of hydrophilic polymer that fills the mesh is insufficient. As a result, not only does the overall waterproofing effect of the coating layer decrease, but also by using a large amount of insoluble fiber material, there is a problem in that the cost increases.

(Other)

The dust scatter preventing agent of the present invention is such that in addition to the hydrophilic polymer and insoluble fiber material, other various additional materials can be added according to the purpose and usage. More specifically, for the purpose of adding color to the coating layer, it is possible to add pigment, and for the purpose of improving the incombustibility of the coating layer, it is possible to add flame retardant. Moreover, in order to adjust the thickness of the coating layer, or in order to further increase the strength of the coating layer, it is possible to add a viscosity modifier. Furthermore, in order to adjust the pH, or in order to adsorb any harmful material such as heavy metals or radioactive materials, it is possible to add fine particle shaped zeolite or dolomite.

By adding these additional materials, it is possible to obtain effects such as making it easier to perform suitable spraying, easily preventing the flowing away of dust scatter preventing agent even after it rains, or maintaining the effect of preventing the scattering of dust over a long period of time, or it is possible to more efficiently prevent or reduce the effect on the environment due to harmful materials included in an object.

The contained amount of such additional materials with respect to the hydrophilic polymer is preferably 0.2 or less by mass ratio, and more preferably 0.1 or less. When the mass ratio is greater than 0.2, it becomes difficult to keep the contained amount of other included components within the proper ranges.

The aqueous medium used in the dust scatter preventing agent of the present invention is not particularly limited as long as the insoluble fiber material or additional material that is added can be uniformly dispersed, however, from the aspects of the ease of handling and cost, preferably water is used.

(2) Method for Producing Dust Scatter Preventing Agent

The method for producing the dust scatter preventing agent of the present invention is not particularly limited as long as the agent has the composition described above, and it can be produced, for example, by the method described below.

First, a polymer aqueous solution is formed by dissolving a hydrophilic polymer in water that has been heated to 20° C. so that the concentration of the hydrophilic polymer is 0.1% by mass to 10% by mass. When a polymer having a form other than polymer fiber is used as the hydrophilic polymer, preferably a dissolver tank is used, and the hydrophilic polymer is dissolved while stirring in water that has been heated to 60° C. to 98° C.

Next, insoluble fiber material is added to the obtained polymer aqueous solution so that the mass ratio with respect to the polymer is 0.1 to 1, and mixed so that the insoluble fiber material is uniformly dispersed in the polymer aqueous solution. When additional materials are added as described above, the additional materials can be added and mixed in at the same time that the insoluble fiber material is added so that the mass ratio with respect to the polymer is 0.2 or less. The method of mixing when doing this is not particularly limited, and a well-known method can be used. For example, a shaker mixer, a Loedige mixer, a Julia mixer and the like can be used.

(3) Characteristics of Dust Scatter Preventing Agent

The dust scatter preventing agent of the present invention uses a hydrophilic polymer such as PVA or a synthetic resin emulsion as a resin component that has a property of being solidified, and has a contact angle with water after solidification of 45 degrees to 78 degrees, so when compared with a conventional dust scatter preventing agent that uses a synthetic resin such as polyvinyl acetate, styrene acrylic acid ester copolymer and the like, it is possible to obtain a good effect of preventing the scattering of dust even when only a small amount of resin component is used.

Moreover, a fine insoluble fiber material is uniformly dispersed in the dust scatter preventing agent of the present invention, so the coating layer that is formed with this agent being solidified has insoluble fiber material uniformly dispersed inside. Therefore, the coating layer that is formed using the dust scatter preventing agent of the present invention has greatly improved strength when compared with that formed using a conventional dust scatter preventing agent that does not include a fiber material.

Figure 2:
FIG. 2 is an SEM image (50×) illustrating a state in which a coating layer that was formed by a conventional dust scatter preventing agent catches fine particles such as dust.

Particularly, in the present invention, an insoluble fiber material having a cut length within the range of 0.5 mm to 30 mm, a fineness within the range of 0.1 dtex to 20 dtex, and a degree of swelling that is greater than 150% but no greater than 300% is used as the insoluble fiber material. Therefore, with the dust scatter preventing agent of the present invention, the coating layer is formed into a non-woven form, and it is possible to catch fine particles that are 100 μm or less that are included in an object (see FIG. 1). In regard to this, in a dust scatter preventing agent that does not include an insoluble fiber material, or in a dust scatter preventing agent that does include an insoluble fiber material but that does not have a cut length, fineness or degree of swelling that are within the ranges described above, the coating layer is not formed into a nonwoven form, and in order to obtain the same effect, it is necessary to add even more polymer or fiber material (see FIG. 2).

Furthermore, the coating layer that is formed using the dust scatter preventing agent of the present invention has suitable re-dissolution with respect to the moisture content. Therefore, when an object such as tailings is accumulated on the surface of the coating layer, part of the coating layer is dissolved by the moisture content that is included in the object, and the newly accumulated layer and the accumulated layer directly below form an accumulated layer that has become one by way of the coating layer. As a result, even when objects such as tailings are accumulated several times to become a so-called "slag heap", it is possible to keep this slag heap from giving way and collapsing.

In addition, the coating layer that is formed using the dust scatter preventing agent of the present invention has excellent water absorbency and waterproofing. More specifically, the speed of water absorption that is measured by a method that complies with a standard water absorbency test method (JIS1907 2004) can preferably be made to be less than 60 seconds, and more preferably less than 30 seconds, and even more preferably less than 15 seconds. Moreover, the coefficient of permeability that is measured by a method that complies with a standard variable head permeability testing method (JIS A1218) can be made to be 0.030 cm/sec or less. Therefore, with the dust scatter preventing agent of the present invention, when an object such as tailings is newly accumulated on the surface of the coating layer, part of the surface of the coating layer can be dissolved by the moisture content included in the object, and thus it is possible to make the newly accumulated object one with the coating layer in a short time. On the other hand, the moisture that is included in the object does not pass through the coating layer and reach the object directly below, so it is possible to effectively prevent harmful material that is included in the object from flowing out to the outside.

2. Dust Scatter Preventing Method

The dust scatter preventing agent of the present invention displays the function thereof by solidification after being uniformly spread over an object such as tailings. When doing this, the thickness of the coating layer that is formed is preferably 1 mm to 5 mm, and more preferably 2 mm to 4 mm. When the thickness of the coating layer is less than 1 mm, it is not possible to sufficiently obtain the effects described above. Moreover, when the thickness is greater than 5 mm, not only is it not possible to obtain more of the effect described above, but the amount of dust scatter preventing agent that is used is increased, so there is an increase in running cost.

The method for spreading this kind of dust scatter preventing agent is not particularly limited as long as the agent can be uniformly spread over an object, and as in the case of the conventional technology, it is possible to spread the agent using a spreading pump and the like. The amount of agent spread is appropriately adjusted according to the characteristics of the object, the viscosity of the dust scatter preventing agent and the like, however, normally 0.5 L/m$^2$ to 8 L/m$^2$ is preferred, and 1 L/m$^2$ to 4 L/m$^2$ is even more preferred. By keeping the amount of dust scatter preventing agent that is spread within such a range, controlling the thickness of the coating layer to be within the range described above becomes simple. When the amount spread is less than 0.5 L/m$^2$, it becomes difficult to uniformly spread the agent over the object. On the other hand, when the amount spread is greater than 8 L/m$^2$, not only is it not possible to obtain a greater effect, but the amount of dust scatter preventing agent used increases, and thus there is an increase in the running cost.

The dust scatter preventing agent of the present invention can be used for not only a dry object, but also in the case in which the object includes moisture and has a gel-like composition. In that case, there is no problem of scattering dust, however, it is possible to obtain the effect of maintaining the moisture inside the gel-like composition and preventing the object from becoming overly dry. A gel-like composition means that fine tailings are dispersed in water or the like, and have become muddy.

EXAMPLES

In the following, the present invention will be explained in further detail. In the examples below, in one section (1 m×1 m) of a laboratory, a 4 mm thick accumulated layer of tailings that includes particles having a particle size of 100 μm or less is reproduced, and a coating layer is formed on the surface of this accumulated layer by spreading a specified amount of dust scatter preventing agent using a sprayer (pressure sprayer HS-251BT, manufactured by Koshin, Ltd.) having a 1 mm diameter nozzle. The characteristics of the coating layer were evaluated by performing: (a) a dust scatter preventing effect test, (b) a water absorption test, (c) a re-dissolution evaluation test, and (d) a permeability evaluation on the coating layer that was obtained in this way.

(a) Dust Scatter Preventing Effect Test

Evaluation of the dust scatter preventing effect was performed by forming a coating layer by spreading dust scatter preventing agents of examples 1 to 22 and comparative examples 1 to 6 on the top of an accumulated layer that is reproduced in a laboratory, and then blowing air at a speed of 25 m/s to 30 m/s and measuring the amount of dust scattered and the retention of the coating layer. The amount of dust that is scattered was calculated by finding the difference between the mass of the accumulated layer that is measured beforehand, and the mass of the accumulated layer after dust has scattered. The retention of the coating layer was calculated by finding the ratio of the surface area of the portion where dust has been scattered with respect to the total surface area of the coating layer.
(b) Water Absorption Test Evaluation of the water absorbency was performed by measuring the water absorption speed of the hardened coating layer by using a test method that complies with a standard water absorbency test method (JIS1907 2004).
(c) Re-Dissolution Evaluation Test Evaluation of the re-dissolution of the coating layer was performed by putting a 5 cm×5 cm sample that had been cut from the coating layer into a mixing tank with 1 L of water, and mixing for 10 minutes at 700 rpm using a mixer (Tornado Standard SM-103, manufactured by As One Corporation), then collecting the residue using 5 mm metal mesh, and measuring the mass after drying for 8 hours at 50° C.
(d) Permeability (Waterproofing) Evaluation Evaluation of the permeability, or in other words, evaluation of the waterproofing by the coating layer was performed by measuring the coefficient of permeability using a variable head permeability tester (manufactured by Nishinihonshikenki) that complied with JIS A1218.

Example 1

A polymer aqueous solution in which PVA (PVA-CST, manufactured by Kuraray Co., Ltd.), having a contact angle of 57 degrees, degree of polymerization of 1700, and degree of saponification of 96 mol %, was dissolved in pure water that was heated to 60° C. so that the PVA concentration was 1% by mass was produced as a hydrophilic polymer. Vinylon (VPB105-2, manufactured by Kuraray Co., Ltd.), having a solubility temperature of 65° C., was added to the polymer aqueous solution as an insoluble fiber material. When doing this, the contained amount of the vinylon with respect to the PVA was 5:1 by mass ratio of hydrophilic polymer:fiber material. Moreover, the cut length of the vinylon that was used was 4 mm, the fiber fineness was 1.7 dtex, and the degree of swelling was 200%. A dust scatter preventing agent was obtained by sufficiently mixing the components of this mixture using a shaker mixer.

After that, the dust scatter preventing agent of Example 1 was spread over the surface of an accumulated layer that was reproduced in a laboratory at ratio of 1 L/m². The dust scatter preventing agent of Example 1 was completely hardened by being allowed to sit for 24 hours at a temperature of 50° C., and a coating layer having a thickness of 2 mm was formed on the surface of the accumulated layer.

Figure 3:
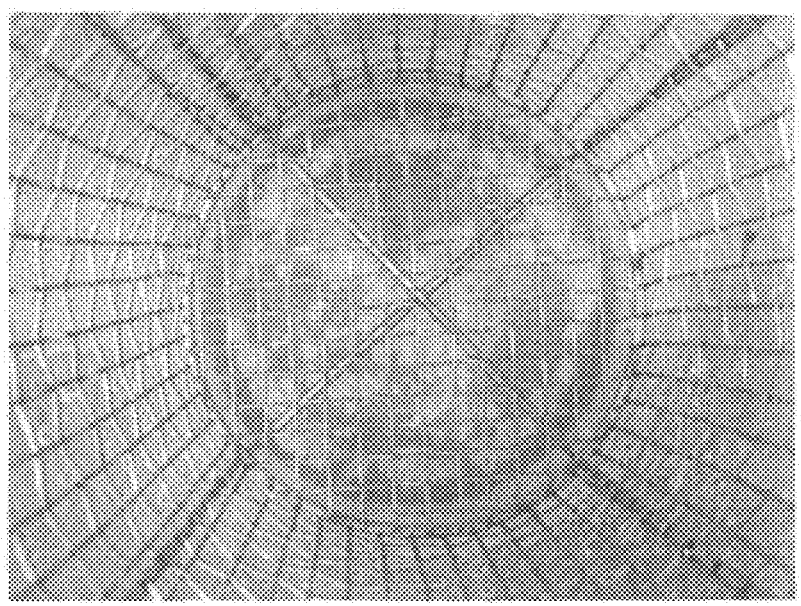
FIG. 3 is a photograph illustrating the state of a sample after mixing in a re-dissolution test of a first example.

Evaluation tests (a) to (d) were performed on the coating layer that was obtained in this way. The test results are given in Table 4. Moreover, FIG. 3 illustrates the state of the sample after mixing in the re-dissolution evaluation test.

Examples 2 to 22

Comparative Examples 1 to 6

Figure 4:
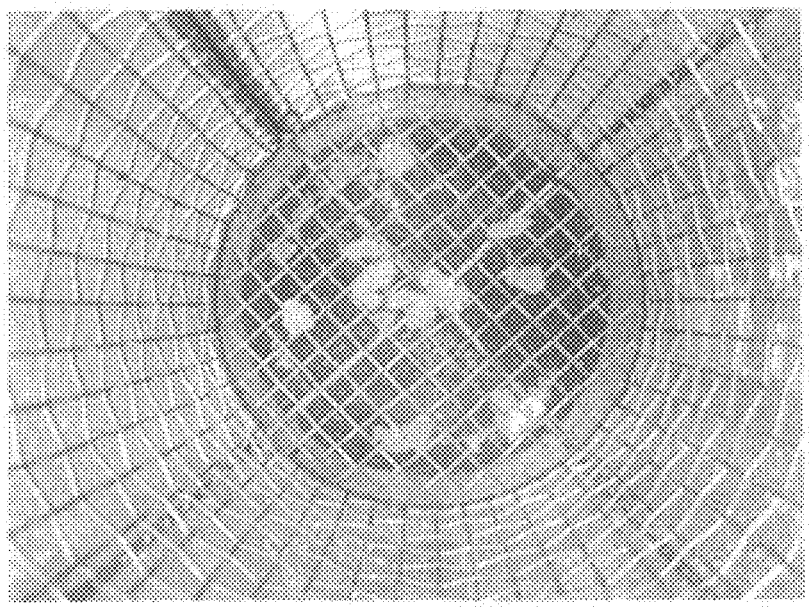
FIG. 4 is a photograph illustrating the state of a sample after mixing in a re-dissolution test of a fourth comparative example.
Figure 5:
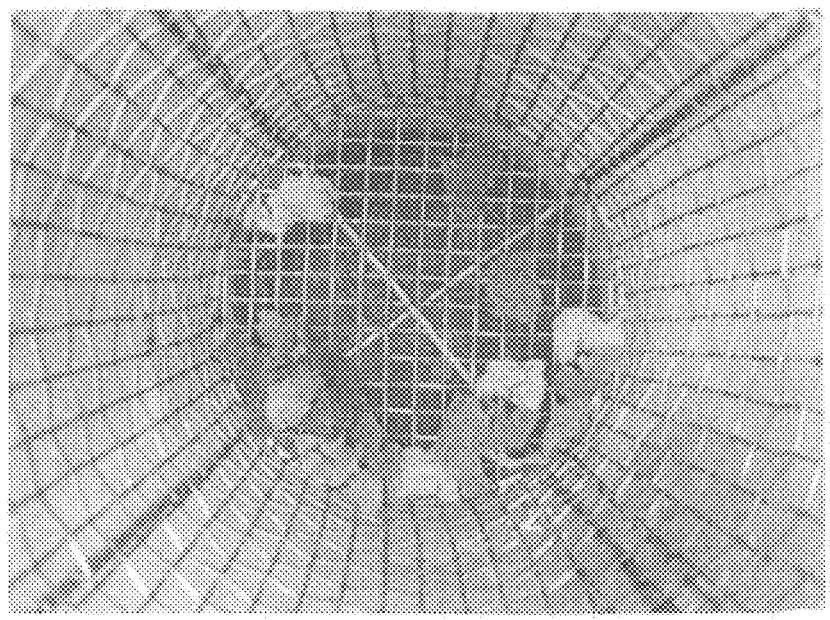
FIG. 5 is a photograph illustrating the state of a sample after mixing in a re-dissolution test of a fifth comparative example.

Except for the types of hydrophilic polymer and insoluble fiber material used and the amounts included being as given in Table 1 to Table 3, dust scatter preventing agents of Examples 2 to 22 and Comparative Examples 1 to 6 were obtained in the same way as in Example 1. A specified amount of each these dust scatter preventing agents was spread over the surface of an accumulated layer that was reproduced in a laboratory in the same way as in Example 1 and completely hardened by being allowed to sit for 24 hours at a temperature of 50° C. After that, evaluation tests (a) to (d) were performed in the same way as in Example 1. These test results are given in Table 4. Moreover, FIG. 4 illustrates the state of the sample after mixing in the re-dissolution evaluation test for Comparative Example 4, and FIG. 5 illustrates the same for Comparative Example 5.

TABLE 1

| Symbol | Polymer Type | Characteristics |
|---|---|---|
| a | PVA (PVA-CST, manufactured by Kuraray Co., Ltd.) | Contact angle: 57°, Polymerization degree: 1700, Saponification degree: 96% |
| b | PVA (WN4, manufactured by Kuraray Co., Ltd.) | Contact angle: 59°, Polymerization degree: 1700, Saponification degree: 97% (Cut length: 4 mm, fiber fineness: 1.7 dtex) |
| c | PVA (PVA-HC, manufactured by Kuraray Co., Ltd.) | Contact angle: 60°, Polymerization degree: 1700, Saponification degree: 99% |
| d | Ethylene vinyl acetate emulsion (OM4200NT, manufactured by Kuraray Co., Ltd.) | Contact angle: 67° |
| e | Ethylene vinyl acetate emulsion (OM4000NT, manufactured by Kuraray Co., Ltd.) | Contact angle: 60° |
| f | Ethylene vinyl acetate emulsion (OM5500NT, manufactured by Kuraray Co., Ltd.) | Contact angle: 78° |
| g | Synthetic resin emulsion (C-720, manufactured by Kurita Kogyo Co., Ltd.) | Contact angle: 65° |
| h | Ethylene vinyl acetate emulsion (OM28NT, manufactured by Kuraray Co., Ltd.) | Contact angle: 46° |
| i | Acrylic emulsion (SFC-55, manufactured by DIC Corporation) | Contact angle: 80° |

TABLE 2

| Symbol | Fiber Material Type | Characteristics |
|---|---|---|
| l | Vinylon (VPB105-2, manufactured by Kuraray Co., Ltd.) | Cut length: 4 mm, Fiber fineness: 1.2 dtex, Degree of swelling: 200% PVA-based (Polymerization degree: 1700, Saponification degree: 98%, Solubility temperature in water: 65° C.) |
| m | Vinylon (VPB105-2, manufactured by Kuraray Co., Ltd.) | Cut length: 10 mm, Fiber fineness: 1.2 dtex, Degree of swelling: 200% PVA-based (Polymerization degree: 1700, Saponification degree: 98%, Solubility temperature in water: 65° C.) |

TABLE 2-continued

| Symbol | Fiber Material Type | Characteristics |
|---|---|---|
| n | Vinylon (VPB105-1, manufactured by Kuraray Co., Ltd.) | Cut length: 4 mm, Fiber fineness: 1.2 dtex, Degree of swelling: 160% PVA-based (Polymerization degree: 1700, Saponification degree: 99%, Solubility temperature in water: 72° C.) |
| o | Vinylon (VPW101, manufactured by Kuraray Co., Ltd.) | Cut length: 3 mm, Fiber fineness: 1.2 dtex, Degree of swelling: 250% PVA-based (Polymerization degree: 1700, Saponification degree: 96%, Solubility temperature in water: 56° C.) |
| p | PET (manufactured by Kuraray Co., Ltd.) | Cut length: 4 mm, Fiber fineness: 3.5 dtex, Degree of swelling: 12%, Insoluble |
| q | PVB (manufactured by Kuraray Co., Ltd.) | Cut length: 4 mm, Fiber fineness: 3.5 dtex, Degree of swelling: 10%, Insoluble |
| r | Vinylon (VPB105-0, manufactured by Kuraray Co., Ltd.) | Cut length: 4 mm, Fiber fineness: 1.2 dtex, Degree of swelling: 120% PVA-based (Polymerization degree: 1700, Saponification degree: 98%, Solubility temperature in water: 73° C.) |
| s | Vinylon (VPB105-2, manufactured by Kuraray Co., Ltd.) | Cut length: 4 mm, Fiber fineness: 20 dtex, Degree of swelling: 200% PVA-based (Polymerization degree: 1700, Saponification degree: 98%, Solubility temperature in water: 65° C.) |
| t | Vinylon (VPB105-2, manufactured by Kuraray Co., Ltd.) | Cut length: 4 mm, Fiber fineness: 0.1 dtex, Degree of swelling: 200% PVA-based (Polymerization degree: 1700, Saponification degree: 98%, Solubility temperature in water: 65° C.) |
| u | Vinylon (VPB105-2, manufactured by Kuraray Co., Ltd.) | Cut length: 30 mm, Fiber fineness: 20 dtex, Degree of swelling: 200% PVA-based (Polymerization degree: 1700, Saponification degree: 98%, Solubility temperature in water: 65° C.) |
| v | Vinylon (VPB105-2, manufactured by Kuraray Co., Ltd.) | Cut length: 0.5 mm, Fiber fineness: 20 dtex, Degree of swelling: 200% PVA-based (Polymerization degree: 1700, Saponification degree: 98%, Solubility temperature in water: 65° C.) |

TABLE 3

| | Polymer [A] | | Fiber Material [B] | | | | | |
|---|---|---|---|---|---|---|---|---|
| | Type | Contact Angle (degrees) | Concentration (%) | Type | Fineness (dtex) | Cut Length (mm) | Swelling (%) | Solubility Temp. in Water (° C.) | Mass Ratio [B/A] | Spread Amount (L/m²) |
| EX 1 | a | 57 | 1.0 | l | 1.2 | 4 | 200 | 65 | 0.2 | 1 |
| EX 2 | a | 57 | 1.0 | l | 1.2 | 4 | 200 | 65 | 0.5 | 1 |
| EX 3 | a | 57 | 1.0 | l | 1.2 | 4 | 200 | 65 | 0.125 | 1 |
| EX 4 | b | 59 | 1.0 | l | 1.2 | 4 | 200 | 65 | 0.2 | 1 |
| EX 5 | c | 60 | 1.0 | l | 1.2 | 4 | 200 | 65 | 0.2 | 1 |
| EX 6 | a | 57 | 1.0 | l | 1.2 | 4 | 200 | 65 | 0.2 | 4 |
| EX 7 | a | 57 | 1.0 | m | 1.2 | 10 | 200 | 65 | 0.2 | 1 |
| EX 8 | a | 57 | 1.0 | n | 1.2 | 4 | 160 | 72 | 0.2 | 1 |
| EX 9 | a | 57 | 1.0 | o | 1.2 | 3 | 250 | 56 | 0.2 | 1 |
| EX 10 | d | 67 | 1.0 | l | 1.2 | 4 | 200 | 65 | 0.2 | 1 |
| EX 11 | e | 60 | 1.0 | l | 1.2 | 4 | 200 | 65 | 0.2 | 1 |
| EX 12 | f | 78 | 1.0 | l | 1.2 | 4 | 200 | 65 | 0.2 | 1 |
| EX 13 | g | 65 | 4.0 | l | 1.2 | 4 | 200 | 65 | 0.125 | 2 |
| EX 14 | h | 46 | 1.0 | l | 1.2 | 4 | 200 | 65 | 0.2 | 1 |
| EX 15 | a | 57 | 1.0 | p | 3.5 | 4 | 12 | — | 0.2 | 1 |
| EX 16 | a | 57 | 1.0 | q | 3.5 | 4 | 10 | — | 0.2 | 1 |
| EX 17 | a | 57 | 1.0 | r | 1.2 | 4 | 120 | 73 | 0.2 | 1 |
| EX 18 | a | 57 | 1.0 | s | 20 | 4 | 200 | 65 | 0.2 | 1 |
| EX 19 | a | 57 | 1.0 | t | 0.1 | 4 | 200 | 65 | 0.2 | 1 |
| EX 20 | a | 57 | 1.0 | u | 20 | 30 | 200 | 65 | 0.2 | 1 |
| EX 21 | a | 57 | 1.0 | v | 20 | 0.5 | 200 | 65 | 0.2 | 1 |
| EX 22 | a | 57 | 1.0 | l | 1.2 | 4 | 200 | 65 | 1.0 | 1 |
| CE 1 | a | 57 | 1.0 | — | — | — | — | — | — | 1 |
| CE 2 | c | 60 | 1.0 | — | — | — | — | — | — | 1 |
| CE 3 | d | 67 | 1.0 | — | — | — | — | — | — | 1 |
| CE 4 | g | 65 | 1.0 | — | — | — | — | — | — | 1 |
| CE 5 | g | 65 | 4.2 | — | — | — | — | — | — | 2 |
| CE 6 | i | 80 | 1.0 | l | 1.2 | 4 | 200 | 65 | 0.2 | 1 |

EX: Example,
CE: Comparative Example

TABLE 4

| | Dust Scatter Preventing Effect | | | | |
|---|---|---|---|---|---|
| | Retention of Coating Layer (%) | Amount of Scattered Dust (g) | Absorbency Absorption Speed (sec) | Re-dissolution Dry Mass of Residue (g) | Permeability Permeability Coefficient (cm/sec) |
| Example 1 | 98 | 0 | 5 | 0 | 0.030 |
| Example 2 | 99 | 0 | 5 | 0 | 0.030 |
| Example 3 | 95 | 0 | 5 | 0 | 0.030 |
| Example 4 | 98 | 0 | 5 | 0 | 0.030 |
| Example 5 | 98 | 0 | 5 | 0 | 0.030 |
| Example 6 | 100 | 0 | 10 | 0 | 0.020 |
| Example 7 | 100 | 0 | 5 | 0 | 0.030 |
| Example 8 | 98 | 0 | 5 | 0 | 0.030 |
| Example 9 | 98 | 0 | 5 | 0 | 0.030 |
| Example 10 | 100 | 0 | 21 | 0.02 | 0.010 |
| Example 11 | 100 | 0 | 18 | 0.02 | 0.010 |
| Example 12 | 100 | 0 | 25 | 0.03 | 0.010 |
| Example 13 | 100 | 0 | 60 | 0.58 | 0.003 |
| Example 14 | 100 | 0 | 14 | 0.02 | 0.020 |
| Example 15 | 93 | 2 | 12 | 0 | 0.020 |
| Example 16 | 93 | 2 | 12 | 0 | 0.020 |
| Example 17 | 95 | 1 | 5 | 0 | 0.030 |
| Example 18 | 98 | 0 | 5 | 0 | 0.030 |
| Example 19 | 96 | 1 | 5 | 0 | 0.030 |
| Example 20 | 98 | 1 | 5 | 0.03 | 0.030 |
| Example 21 | 96 | 1 | 5 | 0.02 | 0.030 |
| Example 22 | 95 | 2 | 5 | 0.02 | 0.030 |
| CE 1 | 80 | 90 | 2 | 0 | 0.050 |
| CE 2 | 65 | 90 | 2 | 0 | 0.050 |
| CE 3 | 88 | 100 | 19 | 0.02 | 0.010 |
| CE 4 | 74 | 80 | 39 | 0.19 | 0.020 |
| CE 5 | 100 | 0 | >120 | 2.24 | 0.001 |
| CE 6 | 100 | 0 | >120 | 5.42 | 0.001 |

CE: Comparative Example

[Evaluation]

For Examples 1 to 22 that belong to the technical scope of the present invention, the results of evaluations (a) to (d) were mostly good, and it was confirmed that the effect of the present invention was sufficiently displayed and obtained. Particularly, in Examples 1 to 14 and Example 18, a large dust scatter preventing effect was confirmed. On the other hand, in Examples 15 to 17, the degree of swelling of the insoluble fiber material was outside the range of the present invention, so when compared with Examples 1 to 14 and Example 18, the dust scatter preventing effect was a little inferior. Moreover, in Examples 19 to 22, at least one of the fiber fineness and cut length of the insoluble fiber material is outside the suitable range, so similarly, the dust scatter preventing effect was a little inferior.

On the other hand, Comparative Examples 1 to 5 are examples that do not include insoluble fiber material. Comparative Examples 1 to 4 have good absorption speed and re-dissolution, however, a sufficient dust scatter preventing effect is not obtained. In Comparison Example 5, the concentration and spread amount of polymer is increased, so a sufficient dust scatter preventing effect was obtained, however, due to this increase, the absorption speed and the re-dissolution decreased.

Moreover, in Comparative Example 6, the contact angle of the polymer was to large, so even thought the dust scatter preventing effect was sufficient, the absorption speed and re-dissolution became inferior.

What is claimed is:

1. A dust scatter preventing agent comprising an aqueous solution or aqueous dispersion,
   wherein the aqueous solution or aqueous dispersion comprises:
   an aqueous solvent,
   a hydrophilic polymer which dissolves in pure water when heated at 60° C., which is solidified when dried and has a contact angle with water of 45 degrees to 78 degrees after solidification, and
   an insoluble fiber material having a cut length within a range of 0.5 mm to 30 mm and a fineness within a range of 0.1 dtex to 20 dtex,
   wherein
   the hydrophilic polymer is at least one member selected from the group consisting of a polyvinyl alcohol, a polyvinyl alcohol copolymer and ethylene vinyl acetate emulsion,
   the insoluble fiber material is at least one member selected from the group consisting of vinylon, polyethyleneterephthalate, and polyvinyl butyral,
   the amount of the hydrophilic polymer with respect to the aqueous solvent is 0.1% by mass to 10% by mass, and
   the amount of the insoluble fiber material with respect to the hydrophilic polymer is 0.1 to 1 by mass ratio.

2. The dust scatter preventing agent according to claim 1 wherein the insoluble fiber material has a degree of swelling that is greater than 150% but no greater than 300%.

3. The dust scatter preventing agent according to claim 1, wherein the hydrophilic polymer is a ethylene vinyl acetate emulsion.

4. The dust scatter preventing agent according to claim 1, wherein the hydrophilic polymer is in the form of a polymer fiber.

5. The dust scatter preventing agent according to claim 1, wherein the hydrophilic polymer is a polyvinyl alcohol and the polyvinyl alcohol has a degree of polymerization of 1000 to 5000, and a degree of saponification of 95 mol % to 100 mol %.

6. The dust scatter preventing agent according to claim 1, which is in the form of a nonwoven fabric after solidifying.

7. The dust scatter preventing agent according to claim 1, wherein the hydrophilic polymer is a copolymer of polyvinyl alcohol that comprises at least one additional monomer selected from the group consisting of olefins, polymeric monocarboxylic acids, a polymeric dicarbon acids, polymeric dicarbon acid anhydrides, salts or esters of polymeric monocarboxylic acids or polymeric dicarbon acids, polymeric acid amides, acrylic acid esters, methacrylate esters, monomers having a glycidyl group and alkyl vinyl ethers.

8. The dust scatter preventing agent according to claim 1, wherein the hydrophilic polymer is a copolymer of polyvinyl alcohol that comprises at least one additional monomer selected from the group consisting of ethylene, propylene, acrylic acid, methacrylic acid, maleic acid, itaconic acid, maleic anhydride, acrylamide, methacrylamide, methyl acrylate, ethyl acrylate, methyl methacrylate, ethyl methacrylate, allyl glycidyl ether and glycidyl methacrylate.

9. The dust scatter preventing agent according to claim 1, wherein the hydrophilic polymer is a polyvinyl alcohol and the polyvinyl alcohol has a degree of saponification of 95 mol % to 100 mol %.

10. The dust scatter preventing agent according to claim 1, wherein the hydrophilic polymer is a polyvinyl alcohol homopolymer.

11. The dust scatter preventing agent according to claim 1, wherein the amount of the insoluble fiber material with respect to the hydrophilic polymer is 0.1 to 0.7 by mass ratio.

* * * * *